(12) United States Patent
Masuda et al.

(10) Patent No.: US 11,019,312 B2
(45) Date of Patent: May 25, 2021

(54) LIGHT SOURCE DEVICE, PROJECTION DEVICE, AND LIGHT SOURCE CONTROL METHOD

(71) Applicant: CASIO COMPUTER CO., LTD., Tokyo (JP)

(72) Inventors: Hiroki Masuda, Akishima (JP); Masahiro Ogawa, Ome (JP); Osamu Umamine, Fussa (JP); Tetsuro Narikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/801,321

(22) Filed: Feb. 26, 2020

(65) Prior Publication Data

US 2020/0314394 A1 Oct. 1, 2020

(30) Foreign Application Priority Data

Mar. 25, 2019 (JP) .............................. JP2019-056962

(51) Int. Cl.
*H04N 9/31* (2006.01)
*G03B 21/20* (2006.01)

(52) U.S. Cl.
CPC ......... *H04N 9/3117* (2013.01); *G03B 21/204* (2013.01); *H04N 9/3158* (2013.01)

(58) Field of Classification Search
CPC ................ G03B 21/204; G03B 21/208; G03B 21/2013; G03B 21/2033; G03B 21/2053;
(Continued)

(56) References Cited

U.S. PATENT DOCUMENTS 9,843,780 B2   12/2017   Ogawa
2016/0360166 A1   12/2016   Ogawa
(Continued)

FOREIGN PATENT DOCUMENTS

JP   H04248204 A   9/1992
JP   2016105122 A   6/2016
JP   2017003643 A   1/2017

OTHER PUBLICATIONS

Japanese Office Action (and English language translation thereof) dated Mar. 18, 2021 issued in Japanese Application No. 2019-056962.

*Primary Examiner* — Sultan Chowdhury
(74) *Attorney, Agent, or Firm* — Holtz, Holtz & Volek PC

(57) ABSTRACT

A light source device includes: a first light emitting element that emits first wavelength band light; a fluorescence wheel including a fluorescence emission region with which fluorescence excited by the first wavelength band light is emitted as second wavelength band light; a second light emitting element that emits third wavelength band light; a combining unit that combines the first wavelength band light, the second wavelength band light, and the third wavelength band light; a color wheel; and a CPU that controls the first light emitting element, the second light emitting element, the fluorescence wheel, and the color wheel, wherein the CPU performs synchronization control on the fluorescence wheel and the color wheel, and performs control to shift a synchronization position of the color wheel with respect to the fluorescence wheel in accordance with an output mode.

20 Claims, 9 Drawing Sheets

(58) Field of Classification Search
CPC .... G03B 21/2066; G03B 33/08; G03B 33/12; H04N 9/3111; H04N 9/3114; H04N 9/3117; H04N 9/3155; H04N 9/3158; H04N 9/3161; H04N 9/3164; H04N 9/3182
See application file for complete search history.

(56) References Cited

U.S. PATENT DOCUMENTS

2018/0199013 A1   7/2018  Wu et al.
2020/0174354 A1*  6/2020  Cui ..................... G03B 21/204

* cited by examiner

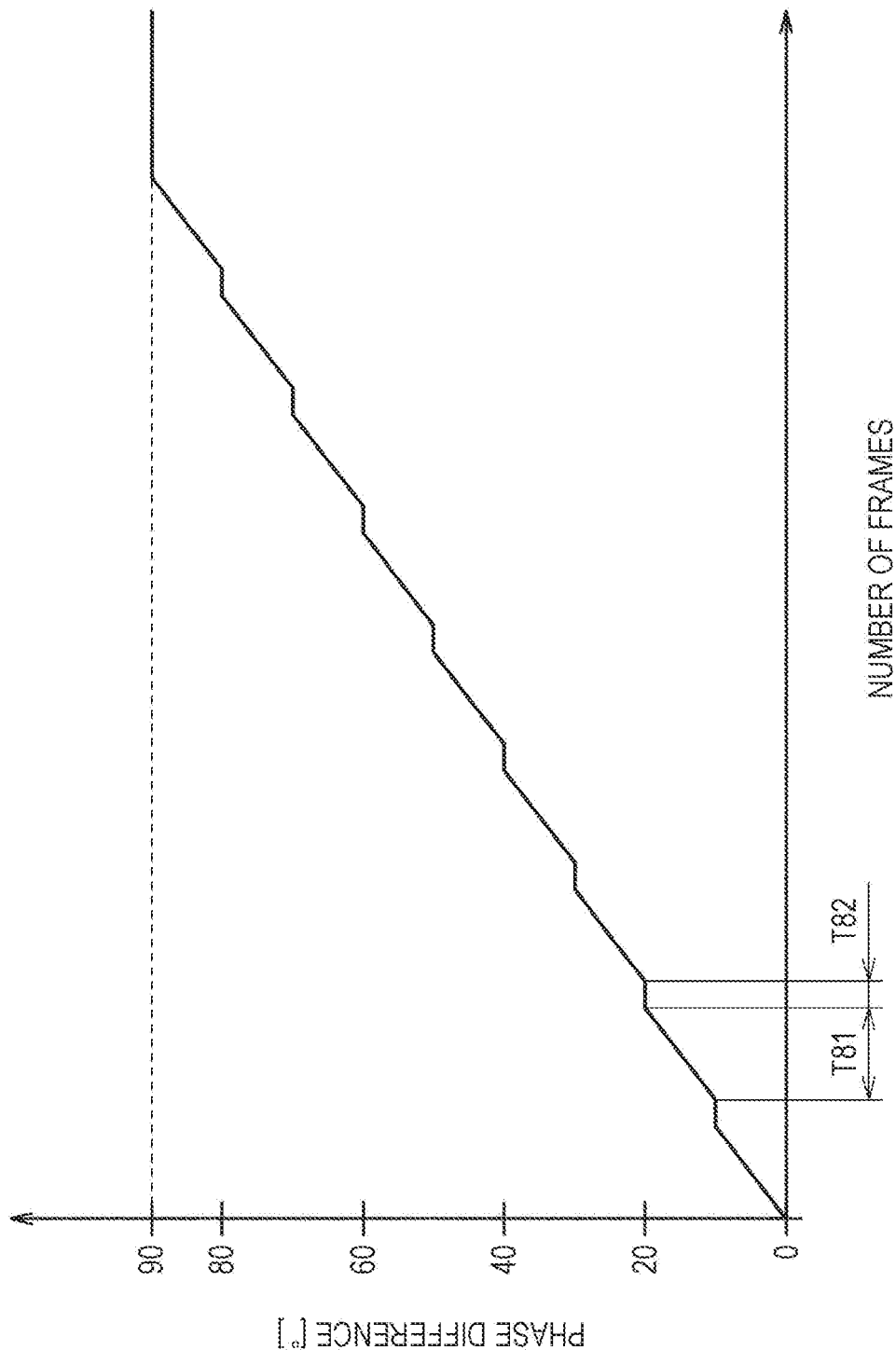

LIGHT SOURCE DEVICE, PROJECTION DEVICE, AND LIGHT SOURCE CONTROL METHOD

BACKGROUND OF THE INVENTION

Field of the Invention

The present invention relates to a light source device, a projection device including the light source device, and a light source control method.

Description of the Related Art

JP-A-2017-3643 discloses a light source device having a light source, a fluorescence wheel, and a color wheel. The light source device performs synchronization control on the fluorescence wheel and the color wheel to emit light in green, red, and blue colors. The fluorescence wheel has a plurality of light source segments that receive light emitted from a light source and emit light rays in different wavelength bands. As the light source segments, a green phosphor layer, a yellow phosphor layer, and a red phosphor layer, and a transmission region that transmits blue wavelength band light are formed. The color wheel has a blue-green transmission region that can transmit blue and green light rays, and a white transmission region that can transmit red, yellow, green, and blue light rays, and thus emits light rays in wavelength bands different from those of the light rays emitted by the fluorescence wheel.

However, the configuration in which the phosphor layers are provided on the fluorescence wheel as disclosed in JP-A-2017-3643 is plagued by physical restriction on the extension range of the emission time of the fluorescence, which is expected to result in a failure to secure sufficient brightness for image forming for some colors. Thus, the color balance may be difficult to ensure over the entire projection image.

In view of the above, an object of the present invention is to provide a light source device, a projection device, and a light source control method achieving improved color balance.

SUMMARY OF THE INVENTION

A light source device includes: a first light emitting element that emits first wavelength band light; a fluorescence wheel including a fluorescence emission region with which fluorescence excited by the first wavelength band light is emitted as second wavelength band light; a second light emitting element that emits third wavelength band light that is on a longer wavelength side than the second wavelength band light; a combining unit that combines the first wavelength band light, the second wavelength band light, and the third wavelength band light; a color wheel including a region with which the third wavelength band light and a part of the second wavelength band light on the long wavelength side are selected as fourth wavelength band light and a region that transmits visible light, the third wavelength band light and the part of the second wavelength band light being combined by the combining unit; and a CPU that controls the first light emitting element, the second light emitting element, the fluorescence wheel, and the color wheel to implement time-division emission of the first wavelength band light and the fourth wavelength band light, wherein the CPU performs synchronization control on the fluorescence wheel and the color wheel, and performs control to shift a synchronization position of the color wheel with respect to the fluorescence wheel in accordance with an output mode.

A light source control method for a light source device including a first light emitting element that emits first wavelength band light, a fluorescence wheel including a fluorescence emission region with which fluorescence excited by the first wavelength band light is emitted as second wavelength band light, a second light emitting element that emits third wavelength band light that is on a longer wavelength side than the second wavelength band light, a combining unit that combines the first wavelength band light, the second wavelength band light, and the third wavelength band light, a color wheel including a region with which the third wavelength band light and a part of the second wavelength band light on the long wavelength side are selected as fourth wavelength band light and a region that transmits visible light, the third wavelength band light and the part of the second wavelength band light being combined by the combining unit, and a CPU, the method including the step of: by the CPU, controlling the first light emitting element, the second light emitting element, the fluorescence wheel, and the color wheel to implement time-division emission of the first wavelength band light and the fourth wavelength band light, performing synchronization control on the fluorescence wheel and the color wheel, and performing control to shift a synchronization position of the color wheel with respect to the fluorescence wheel in accordance with an output mode.

BRIEF DESCRIPTION OF THE DRAWING

FIG. 9 is a schematic diagram illustrating an operation of changing a phase difference of the color wheel with respect to the fluorescence wheel of the light source device according to the embodiment of the present invention.

DETAILED DESCRIPTION OF THE PREFERRED EMBODIMENT

Figure 1:
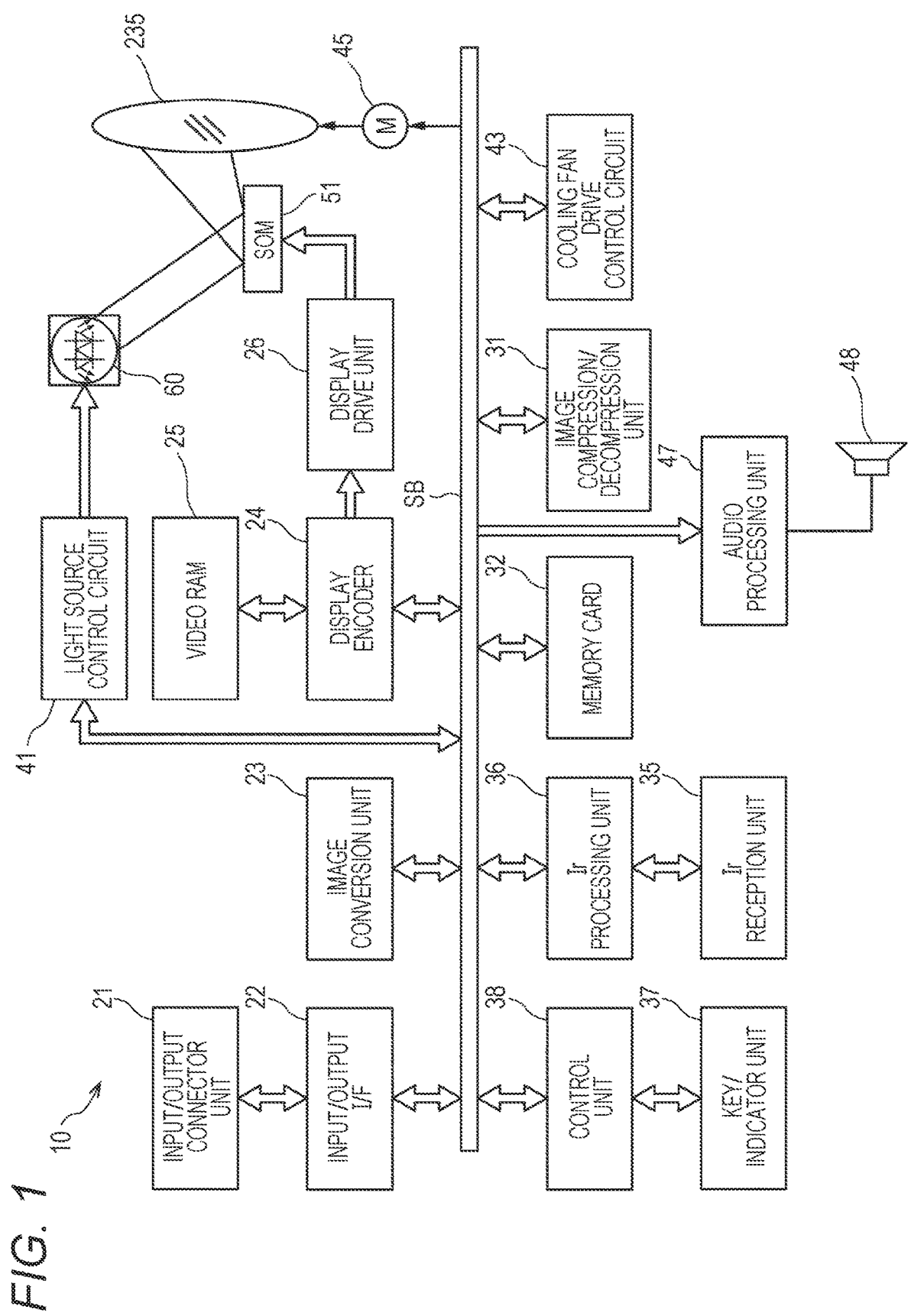
FIG. 1 is a diagram illustrating functional circuit blocks of a projection device according to an embodiment of the present invention.

Hereinafter, embodiments of the present invention will be described. FIG. 1 is a functional circuit block diagram of a projection device 10. A projection device control unit includes: a central processing unit (CPU) including an image conversion unit 23 and a control unit 38; a front end unit including an input/output interface 22; and a formatter unit including a display encoder 24 and a display drive unit 26. Image signals of various formats input through an input/output connector unit 21 are transmitted to the image conversion unit 23 via the input/output interface 22 and a system bus SB, to be converted into image signals of a predetermined unified format suitable for display. Then, the resultant signals are output to the display encoder 24.

Furthermore, the display encoder 24 generates a video signal from the contents stored in a video random access memory (RAM) 25, with the input image signal loaded and stored on the video RAM 25, and outputs the video signal to the display drive unit 26.

The display drive unit 26 drives a display element 51, which is a spatial optical modulator (SOM), at an appropriate frame rate corresponding to the image signal output from the display encoder 24. The projection device 10 irradiates the display element 51 with a light beam emitted from a light source device 60 via a light guiding optical system. With the resultant reflected light from the display element 51, an optical image is formed to be projected onto a screen (not illustrated) via a projection optical system described later. The projection optical system has a movable lens group 235 that can be driven by a lens motor 45 for zoom adjustment and focus adjustment.

An image compression/decompression unit 31 performs a recording process including: executing data compression on a brightness signal and a color difference signal of the image signal using adaptive discrete cosine transformation (ADCT), Huffman coding, and the like; and sequentially writing the compressed data on a memory card 32 which is a removable recording medium. Furthermore, in a playback mode, the image compression/decompression unit 31 reads out image data recorded in the memory card 32, decompresses individual pieces of image data, forming a movie sequence, on a frame-by-frame basis, and outputs the data to the display encoder 24 via the image conversion unit 23. Thus, the image compression/decompression unit 31 can display a movie or the like based on the image data stored in the memory card 32.

The control unit 38 controls the operation of each circuit in the projection device 10, and includes a CPU, a read only memory (ROM) in which operation programs such as various settings are fixedly stored, a RAM used as a work memory, and the like.

A key/indicator unit 37 includes a main key and an indicator provided on a housing. A signal indicating an operation on the key/indicator unit 37 is directly transmitted to the control unit 38. A signal from a remote controller, indicating an operation on a key thereof, is received by an Ir reception unit 35, demodulated into a code signal by an Ir processing unit 36, and then is output to the control unit 38.

The control unit 38 is connected to an audio processing unit 47 via the system bus SB. The audio processing unit 47 includes a sound source circuit such as a pulse code modulation (PCM) sound source. In a projection mode and the playback mode, the audio processing unit 47 converts audio data into an analog signal, and drives the speaker 48 so that amplified sound is emitted.

The control unit 38 controls a light source control circuit 41. The light source control circuit 41 controls an individual operation of an excitation light emitting device of the light source device 60 so that light in a predetermined wavelength band required for image generation is emitted from the light source device 60. Furthermore, the light source control circuit 41 controls the synchronization timing between a fluorescence wheel 101 and a color wheel 201A (see FIG. 2 and the like) based on an instruction from the control unit 38.

Furthermore, the control unit 38 causes a cooling fan drive control circuit 43 to perform temperature detection using a plurality of temperature sensors provided in the light source device 60 and the like, and controls the rotation speed of a cooling fan based on the result of the temperature detection. Furthermore, the control unit 38 performs control such as: causing the cooling fan drive control circuit 43 to keep the cooling fan rotating after the main body of the projection device 10 is turned OFF, based on a timer and the like; or turning OFF the main body of the projection device 10 based on a result of the temperature detection by the temperature sensors. As will be described in detail later, the projection device control unit including the control unit 38 controls a blue laser diode 71 (first light emitting element), a red light emitting diode 121 (second light emitting element), the fluorescence wheel 101, and the color wheel 201A, to perform time-division control on blue wavelength band light; a green wavelength band light (second wavelength band light) or fifth wavelength band light (a part of the second wavelength band light) described later; and fourth wavelength band light. The fourth wavelength band light includes red wavelength band light (third wavelength band light) and a part of the green wavelength band light (second wavelength band light) on a long wavelength side.

Figure 2:
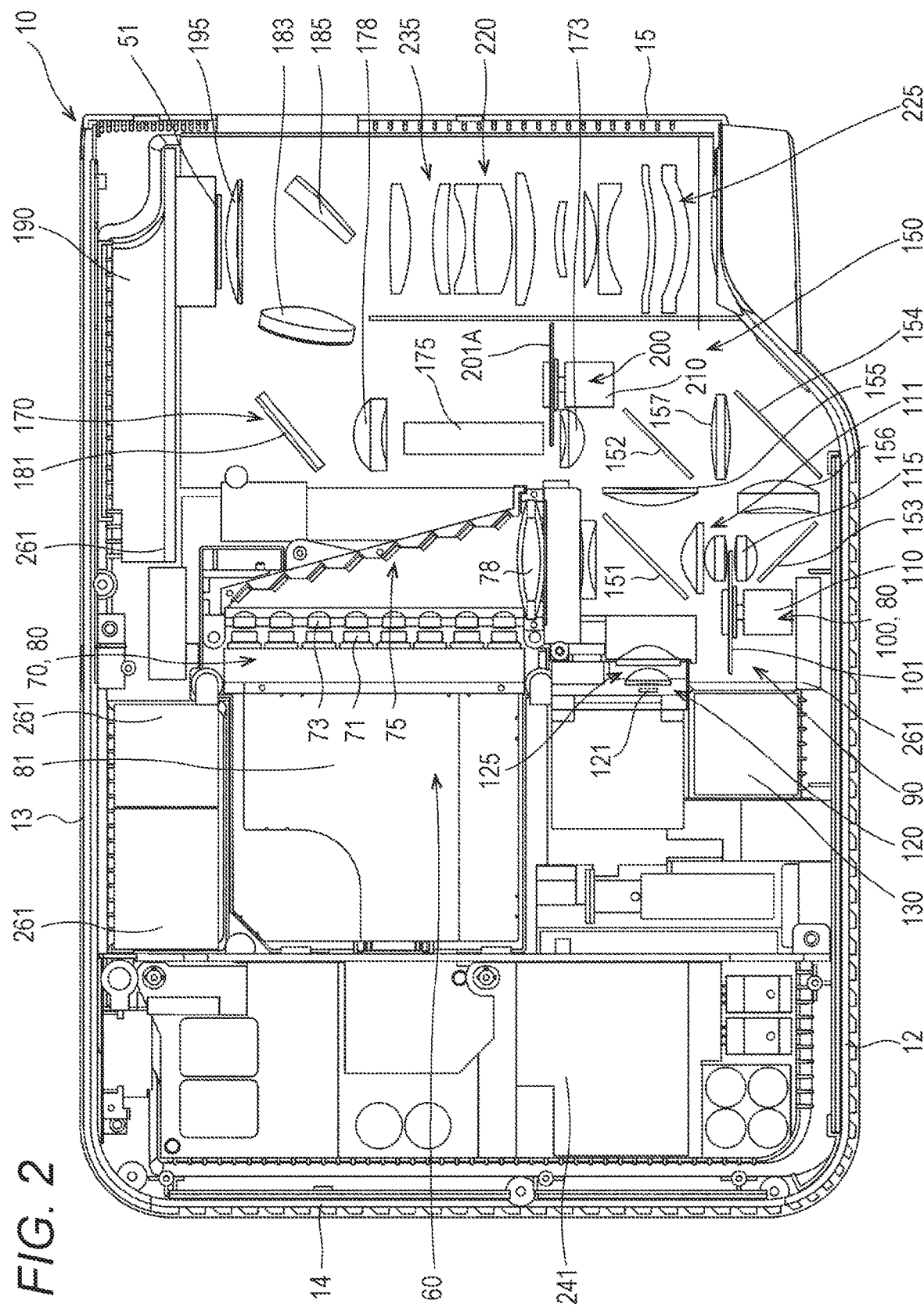
FIG. 2 is a schematic plan view illustrating the internal structure of the projection device according to the embodiment of the present invention.

FIG. 2 is a schematic plan view illustrating the internal structure of the projection device 10. The projection device 10 includes a control circuit board 241 in the vicinity of a right side panel 14. The control circuit board 241 includes a power supply circuit block, a light source control block, and the like. The projection device 10 further includes the light source device 60, a light source optical system 170, and a projection optical system 220 on the left side of the control circuit board 241.

The light source device 60 includes: an excitation light emitting device 70 that is a light source for the blue wavelength band light (first wavelength band light) and also serves as an excitation light source; a green light source device 80 that is a light source for the green wavelength band light (second wavelength band light); a red light source device 120 that is a light source for the red wavelength band light (third wavelength band light); and a color wheel device 200. The green light source device 80 includes the excitation light emitting device 70 and a fluorescence wheel device 100.

The light source device 60 is provided with a light guiding optical system 150 for guiding each wavelength band light. The light guiding optical system 150 guides light emitted from the excitation light emitting device 70, the green light source device 80, and the red light source device 120, to the light source optical system 170.

The excitation light emitting device 70 is arranged in the vicinity of a rear surface panel 13 of the projection device 10. The excitation light emitting device 70 includes a light source group including a plurality of the blue laser diodes 71 and a condenser lens 78. The blue laser diodes 71 (first light emitting elements) are semiconductor light emitting elements, and are arranged to have their optical axes extending in parallel with the rear surface panel 13.

The above light source group is formed with the plurality of blue laser diodes 71 arranged in a matrix. On the optical axes of the respective blue laser diodes 71, collimator lenses 73 that convert the rays of lights into parallel light are disposed for improving the directivity of the light emitted from the blue laser diodes 71. The blue wavelength band light rays emitted from the collimator lenses 73 are reflected by a group of reflecting mirrors 75 in a step-like arrangement, to be guided to the condenser lens 78. The condenser lens 78 condenses the light beams emitted from the blue laser diodes 71 in a single direction, and thus emits the result light toward a first dichroic mirror 151.

The fluorescence wheel device 100 is disposed on the optical path of the excitation light emitted from the excitation light emitting device 70 and in the vicinity of a front surface panel 12. The fluorescence wheel device 100 includes the fluorescence wheel 101, a motor 110, a condenser lens group 111, and a condenser lens 115. The fluorescence wheel 101 is disposed so as to be orthogonal to the optical axis of the light emitted from the excitation light emitting device 70. The motor 110 drivingly rotates the fluorescence wheel 101.

Figure 3A:
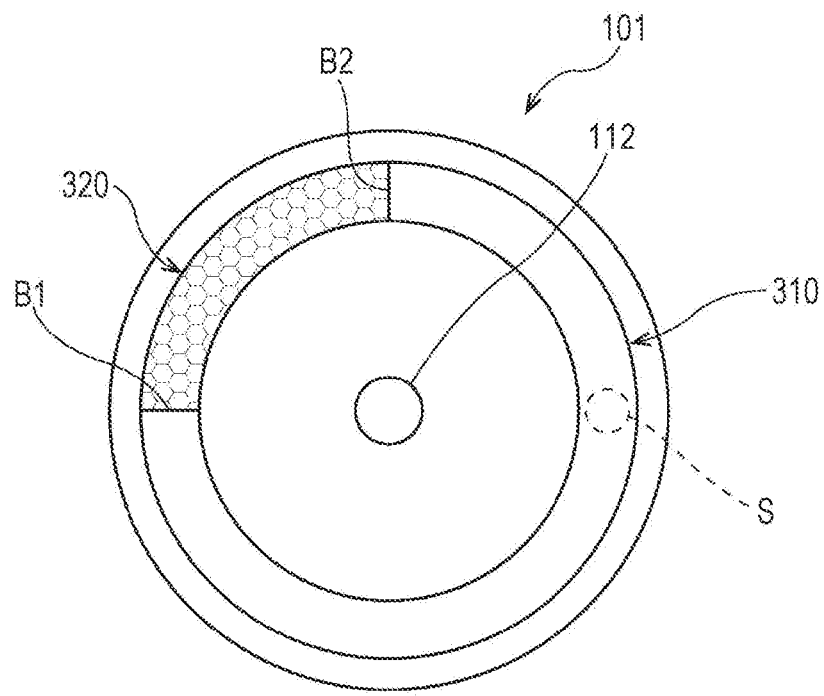
FIG. 3A is a schematic plan view of a fluorescence wheel according to the embodiment of the present invention.

Now, the configuration of the fluorescence wheel 101 will be described. FIG. 3A is a schematic plan view of the fluorescence wheel 101. The fluorescence wheel 101 is formed to have a shape of a disk with an attachment hole portion 112 formed at the center. The motor 110 has a shaft portion fixed in the attachment hole portion 112. Thus, the fluorescence wheel 101 can rotate about the shaft portion when the motor 110 is driven.

The fluorescence wheel 101 has a fluorescence emission region 310 and a transmission region (first transmission region) 320 arranged side by side in a circumferential direction. The fluorescence emission region 310 is formed in an angle range that is approximately 270 degrees, and the transmission region 320 is formed in the remaining angle range that is approximately 90 degrees. The fluorescence wheel 101 may have a substrate made of metal such as copper or aluminum. A surface of this substrate facing the excitation light emitting device 70 is mirror finished by silver evaporation or the like. The fluorescence emission region 310 is formed on this mirror finished surface. A green phosphor layer is formed in the fluorescence emission region 310. The fluorescence emission region 310 receives blue wavelength band light, serving as excitation light, from the excitation light emitting device 70 and emits fluorescence in the green wavelength band in all directions. This fluorescence is incident on the condenser lens group 111 illustrated in FIG. 2.

The transmission region 320 is disposed between both ends of the fluorescence emission region 310 with boundaries B1 and B2 provided between the regions. The transmission region 320 can be formed by fitting a light transmissive transparent substrate into a notched portion formed in the substrate of the fluorescence wheel 101. The transparent substrate is formed of a transparent material such as glass or resin. Furthermore, the transparent substrate may have a surface, on a side to be irradiated with the blue wavelength band light or on the side opposite thereto, provided with a diffusion layer. The diffusion layer can be provided, for example, by forming minute recesses and protrusions by performing sandblasting or the like on this surface of the transparent substrate. The blue wavelength band light from the excitation light emitting device 70 incident on the transmission region 320 is transmitted or diffusely transmitted through the transmission region 320, to be incident on the condenser lens 115 shown in FIG. 2.

Referring back to FIG. 2, the condenser lens group 111 condenses the light beam of the blue wavelength band light emitted from the excitation light emitting device 70 onto the fluorescence wheel 101 and condenses fluorescence emitted from the fluorescence wheel 101 toward the rear surface panel 13. The condenser lens 115 condenses the light beam emitted from the fluorescence wheel 101 toward the front surface panel 12. The excitation light emitting device 70 and the fluorescence wheel device 100 are cooled by heat sinks 81 and 130 and a cooling fan 261 arranged in the projection device 10.

The red light source device 120 is the red light emitting diode 121 (second light emitting element), which is a semiconductor light emitting element arranged to have the optical axis of the light emitted therefrom extending in parallel with the optical axis of the light emitted from the blue laser diode 71, and a condenser lens group 125 that condenses the red wavelength band light emitted from the red light emitting diode 121. The red light source device 120 is arranged in such a manner that the optical axis of the red wavelength band light emitted from the red light emitting diode 121 crosses the optical axis of the blue wavelength band light that is emitted from the excitation light emitting device 70 and is transmitted through the first dichroic mirror 151.

The light guiding optical system 150 includes the first dichroic mirror 151 (combining unit), a second dichroic mirror 152 (combining unit), condenser lenses 155 to 157 for condenser light beams, reflecting mirrors 153 and 154 that converts the optical axes of the light beams into a single optical axis. These members will be described below.

The first dichroic mirror 151 is arranged at a position between the condenser lens 78 and the condenser lens group 111. The first dichroic mirror 151 transmits the blue wavelength band light toward the condenser lens group 111, and reflects the green wavelength band light toward the condenser lens 155 so that the optical axis of the green wavelength band light is shifted by 90 degrees.

The first dichroic mirror 151 is a combining unit that combines the green wavelength band light (second wavelength band light) and the red wavelength band light (third wavelength band light) into light with a single optical axis. The first dichroic mirror 151 reflects the green wavelength band light and transmits the red wavelength band light. The green wavelength band light reflected by the first dichroic mirror 151 is condensed by the condenser lens 155 to be incident on the second dichroic mirror 152. Specifically, the first dichroic mirror 151 (combining unit) reflects a part (light included in a reflection band W1b described with reference to FIG. 4) of the green wavelength band light (second wavelength band light) excluding light on a first long wavelength side, and transmits the red wavelength band light (third wavelength band light), to guide the part of the green wavelength band light (second wavelength band light) excluding the light on the first long wavelength side and the red wavelength band light (third wavelength band light) toward the color wheel 201A via the second dichroic mirror 152. The mirrors 151 to 154 and the condenser lenses 155 to 157 may be appropriately arranged so that the first dichroic mirror 151 transmits the part of the green wavelength band light (second wavelength band light) excluding the light on the first long wavelength side and reflects the red wavelength band light (third wavelength band light), to guide the part of the green wavelength band light (second wavelength band light) excluding the light on the first long wavelength side and the red wavelength band light (third wavelength band light) toward the color wheel 201A.

The red wavelength band light that has transmitted through the first dichroic mirror 151 is condensed by the condenser lens 155 to be incident on the second dichroic mirror 152 that is arranged on the left side panel 15 side of the condenser lens 155. The second dichroic mirror 152 reflects the red wavelength band light and the green wavelength band light and transmits the blue wavelength band light. Thus, the second dichroic mirror 152 reflects the red wavelength band light and the green wavelength band light condensed by the condenser lens 155 to a condenser lens 173, and thus guides the red wavelength band light and the green wavelength band light. Specifically, the second dichroic mirror 152 reflects the part of the green wavelength band light (second wavelength band light) excluding the light on the first long wavelength side and the red wavelength band light (third wavelength band light) that are combined by the first dichroic mirror 151 and transmits the blue wavelength band (first wavelength band light), to guide the blue wavelength band (first wavelength band light), the part of the green wavelength band light, and the red wavelength band light (third wavelength band light) to the color wheel 201A. Alternatively, the light guiding optical system 150 and the light source optical system 170 may be appropriately arranged in such a manner that the part of the green wavelength band light (second wavelength band light) excluding the light on the first long wavelength side and the red wavelength band light (third wavelength band light) that are combined by the first dichroic mirror 151 are transmitted and the blue wavelength band light (first wavelength band light) is reflected, so that the blue wavelength band light (first wavelength band light), the part of the green wavelength band light (the second wavelength band light), and the red wavelength band light (third wavelength band light) are guided to the color wheel 201A.

On the other hand, when the transmission region 320 is an irradiated area S (see FIG. 3A) irradiated with the blue wavelength band light in the fluorescence wheel 101, the blue wavelength band light emitted from the blue laser diode 71 is transmitted through the transmission region 320, condensed by the condenser lens 115, and then is guided to the reflecting mirror 153. The reflecting mirror 153 is disposed on the optical axis of the blue wavelength band light transmitted or diffusely transmitted through the fluorescence wheel 101. The reflecting mirror 153 reflects the blue wavelength band light so that its optical axis is guided to the condenser lens 156 arranged on the left side panel 15 side. The reflecting mirror 154 reflects the blue wavelength band light condensed by the condenser lens 156 and guides the blue wavelength band light toward the condenser lens 157. The blue wavelength band light reflected by the reflecting mirror 154 is condensed by the condenser lens 157, and then is transmitted through the second dichroic mirror 152 to be guided to the condenser lens 173.

The light source optical system 170 includes the condenser lens 173, a light tunnel 175, a condenser lens 178, an optical axis conversion mirror 181, a condenser lens 183, an irradiation mirror 185, and a condenser lens 195. Note that the condenser lens 195 emits the image light, emitted from the display element 51 arranged on the rear surface panel 13 side of the condenser lens 195, toward the projection optical system 220, and thus also serves as a part of the projection optical system 220.

The condenser lens 173 is arranged on the second dichroic mirror 152 side of the light tunnel 175 serving as a light guide member. The condenser lens 173 condenses the green wavelength band light, the blue wavelength band light, and the red wavelength band light guided from the second dichroic mirror 152. The color wheel 201A of the color wheel device 200 is irradiated with each color wavelength band light condensed by the condenser lens 173.

The color wheel device 200 includes the color wheel 201A and a motor 210 that drivingly rotates the color wheel 201A. The color wheel device 200 is disposed between the condenser lens 173 and the light tunnel 175 so that the optical axis of the light beam emitted from the condenser lens 173 can be orthogonal to the irradiation surface on the color wheel 201A.

Figure 3B:
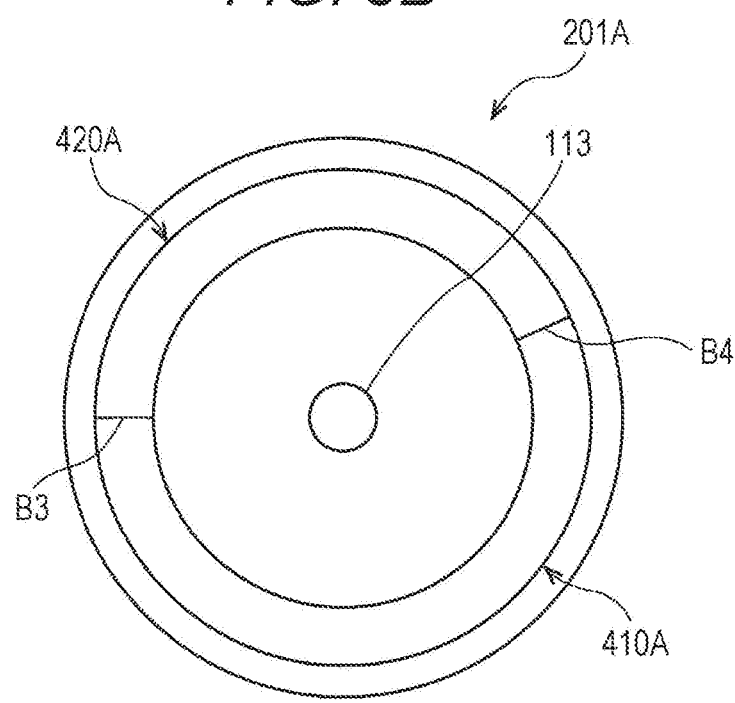
FIG. 3B is a schematic plan view of a color wheel according to the embodiment of the present invention.

FIG. 3B is a schematic plan view of the color wheel 201A. The color wheel 201A is formed to have a shape of a disk with an attachment hole portion 113 formed at the center. The motor 210 has a shaft portion fixed in the attachment hole portion 113. Thus, the color wheel 201A can rotate about the shaft portion when the motor 210 is driven.

The color wheel 201A includes an all-color transmission region 410A (second transmission region) and a blue-red transmission region 420A (third transmission area) arranged side by side in the circumferential direction. The all-color transmission region 410A can transmit the blue wavelength band light, the green wavelength band light, and the red wavelength band light. The blue-red transmission region 420A can transmit the blue wavelength band light and the red wavelength band light, transmit a part of the green wavelength band light on the long wavelength side, and shield a part of the green wavelength band light on a short wavelength side by absorption and the like.

As described above, the color wheel 201A has a plurality of regions, with one of these plurality of regions being a region (the blue-red transmission region 420A) for selecting as the fourth wavelength band light, the red wavelength band light (third wavelength band light) and the part of the green wavelength band light (second wavelength band light) on the long wavelength side that are combined by the first dichroic mirror 151 (combining unit).

Specifically, among the red wavelength band light (third wavelength band light) and the part of the green wavelength band light (second wavelength band light) excluding the light on first long wavelength side, the red wavelength band light and a part (light included in an overlapping band W3 in FIG. 4) of the green wavelength band light on a second long wavelength side on a shorter wavelength side than the first long wavelength side are transmitted through the color wheel 201A. The region, in the color wheel 201A, for selecting the fourth wavelength band light is the blue-red transmission region 420A (third transmission region). The part of the second wavelength band light on the long wavelength side that is transmitted through the color wheel 201A to be selected as the fourth wavelength band light, is on a longer wavelength side than a peak wavelength of the second wavelength band light and is on a shorter wavelength side than a peak wavelength of the third wavelength band light.

Note that, in the color wheel 201A of the present embodiment, the all-color transmission region 410A is formed in an angle range of approximately 204 degrees, and the blue-red transmission region 420A is formed in an angle range of approximately 156 degrees. The blue-red transmission region 420A is arranged adjacent to the all-color transmission region 410A with boundaries B3 and B4 provided between the regions.

Light transmitted through the all-color transmission region 410A or the blue-red transmission region 420A is guided toward the light tunnel 175 in FIG. 2. The light beam entering the light tunnel 175 turns into a light beam having a uniform intensity distribution in the light tunnel 175.

The condenser lens 178 is arranged on the optical axis on the rear surface panel 13 side of the light tunnel 175. The optical axis conversion mirror 181 is arranged closer to the rear surface panel 13 side than the condenser lens 178. The light beam emitted from a light exit of the light tunnel 175 is condensed by the condenser lens 178 and then reflected by the optical axis conversion mirror 181 toward the left side panel 15.

The light beam reflected by the optical axis conversion mirror 181 is condensed by the condenser lens 183, and then is emitted by the irradiation mirror 185 onto the display element 51 at a predetermined angle, via the condenser lens 195. A heat sink 190 is provided on the rear surface panel 13 side of the display element 51 which is a digital mirror device (DMD). The display element 51 is cooled by the heat sink 190.

The light source light emitted from the light source optical system 170 onto an image forming surface of the display element 51 is reflected by the image forming surface of the display element 51, to be projected, as projection light, onto a screen via the projection optical system 220. The projection optical system 220 includes the condenser lens 195, a movable lens group 235, and a fixed lens group 225. The movable lens group 235 is formed to be movable by a lens motor 45. The movable lens group 235 and the fixed lens group 225 are incorporated in a fixed lens barrel. Thus, the fixed lens barrel including the movable lens group 235 serves as a variable focus lens, formed to enable zoom adjustment and focus adjustment.

With the projection device 10 thus configured, when the fluorescence wheel 101 and the color wheel 201A are synchronously rotated and light is emitted from the excitation light emitting device 70 and the red light source device 120 at any appropriate timing, the green wavelength band light, the blue wavelength band light, and the red wavelength band light are incident on the condenser lens 173 via the light guiding optical system 150, and are incident on the display element 51 via the light source optical system 170. Then, the display element 51 displays the rays of light of the respective colors in a time-division manner based on data, so that a color image can be projected on the screen.

Figure 4:
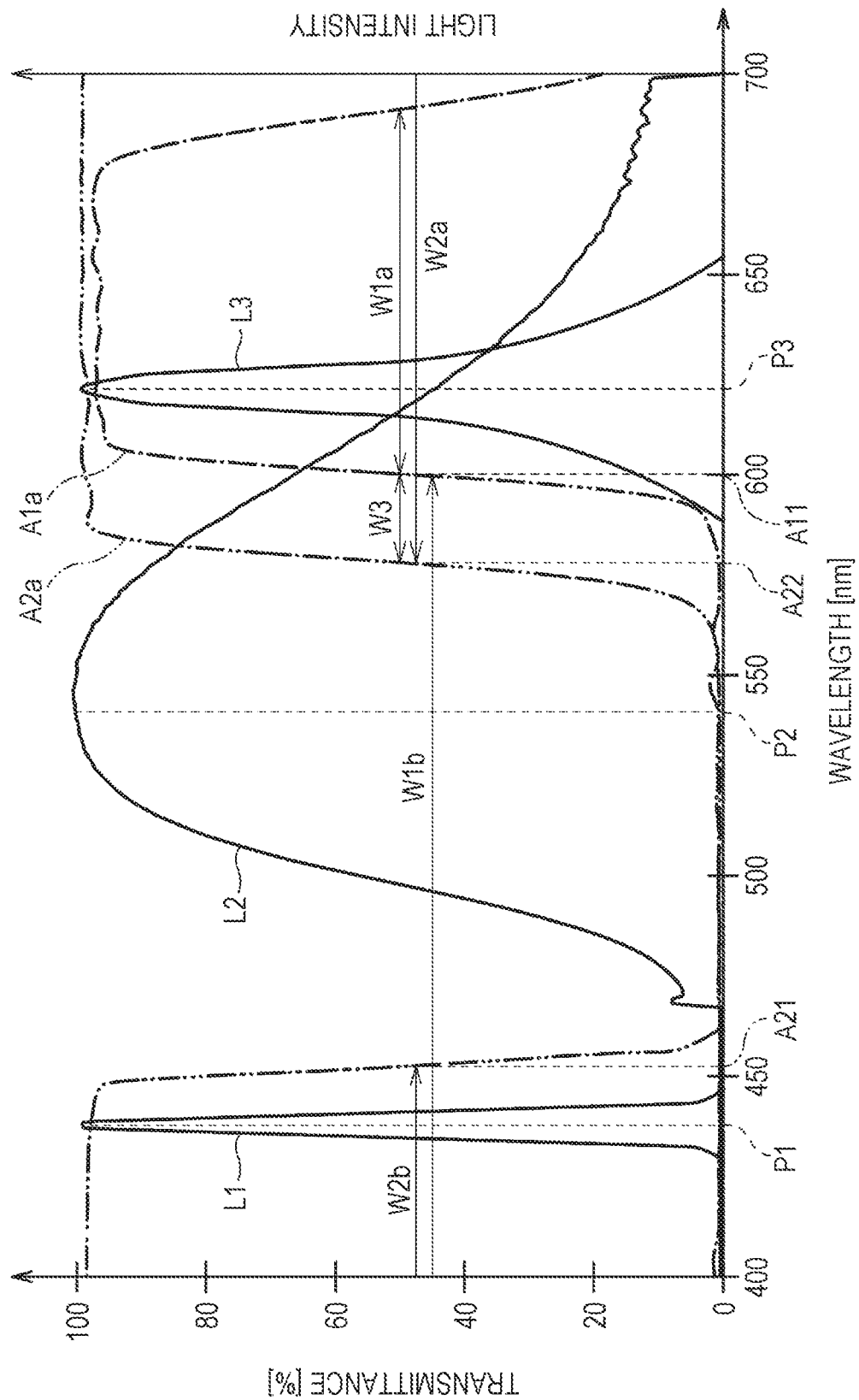
FIG. 4 is a diagram illustrating transmission characteristics of a first dichroic mirror and a second dichroic mirror and a transmission characteristic of a blue-red transmission region of the color wheel according to the embodiment of the present invention.

Next, a transmission characteristic A1a of the first dichroic mirror 151 and a transmission characteristic A2a of the blue-red transmission region 420A of the color wheel 201A will be described with reference to FIG. 4. In FIG. 4, the horizontal axis indicates the wavelength, and the left vertical axis indicates the transmittance of the transmission characteristics A1a and A2a. FIG. 4 also illustrates a wavelength distribution of blue wavelength band light L1 emitted from the blue laser diode 71, green wavelength band light L2 emitted from the fluorescence emission region 310, and red wavelength band light L3 emitted from the red light emitting diode 121. The right vertical axis illustrated in FIG. 4 indicates the light intensity of the blue wavelength band light L1, the green wavelength band light L2, and the red wavelength band light L3.

The blue wavelength band light L1, the green wavelength band light L2, and the red wavelength band light L3 have peak wavelengths P1, P2, and P3 illustrated in this order from the short wavelength side. In the present embodiment, the blue wavelength band light L1 has wavelength components between approximately 30 nm and 440 nm, and the green wavelength band light L2 has wavelength components between approximately 470 nm and 700 nm. The red wavelength band light L3, on a longer wavelength side than the green wavelength band light L2, has wavelength components between approximately 590 nm and 650 nm.

The first dichroic mirror 151 has a transmission band W1a for transmitting light of a predetermined wavelength on the long wavelength side and a transmission band for transmitting the blue wavelength band light L1 (not illustrated in FIG. 4), as indicated by the transmission characteristic A1a. Furthermore, the first dichroic mirror 151 reflects light in the reflection band W1b on a shorter wavelength side than a cut-on wavelength A11 of the transmission band W1a. Therefore, the first dichroic mirror 151 can transmit most of the red wavelength band light L3 emitted from the red light emitting diode 121, to guide this light toward the color wheel 201A. Furthermore, the first dichroic mirror 151 can transmit a part of the green wavelength band light L2 on the long wavelength side (light in the transmission band W1a) emitted from the fluorescence emission region 310, and reflect another part of the green wavelength band light L2 on the short wavelength side (the light in the reflection band W1b), to guide this light toward the color wheel 201A. The part of the green wavelength band light L2 transmitted through the first dichroic mirror 151 is discarded light.

The blue-red transmission region 420A has a transmission band W2a on the long wavelength side for transmitting light in a predetermined wavelength band including blue and red, as indicated by a transmission characteristic A2a illustrated with a two-dot chain line. Furthermore, the blue-red transmission region 420A can shield light having a wavelength on a longer wavelength side than a cut-off wavelength A21 of the transmission band W2a and on a shorter wavelength side than a cut-on wavelength A22, by absorption or the like. Therefore, the blue-red transmission region 420A can transmit most of the red wavelength band light L3 emitted from the red light emitting diode 121, to guide this light toward the light tunnel 175.

In the present embodiment, the overlapping band W3 is provided in which the long wavelength side components in the reflection band W1b and the short wavelength side components in the transmission band W2a overlap with each other. The overlapping band W3 is a band that forms light on the second long wavelength side on a shorter wavelength side than the first long wavelength side described above. The green wavelength band light L2 in the reflection band W1b on a shorter wavelength side than the cut-on wavelength A11 of the first dichroic mirror 151 is guided to the blue-red transmission region 420A of the color wheel 201A. Thus, the blue-red transmission region 420A can transmit the part of the green wavelength band light L2, emitted from the fluorescence emission region 310, in the overlapping band W3 to guide this light to the light tunnel 175. The overlapping band W3 is on a longer wavelength side than the peak wavelength P2 of the green wavelength band light L2 and on a shorter wavelength side than the peak wavelength P3 of the red wavelength band light L3. By combining the light in the overlapping band W3 extracted from the green wavelength band light L2 and the red wavelength band light L3 emitted from the red light emitting diode 121, bright red wavelength band light can be emitted as the light source light of the light source device 60.

Furthermore, the green wavelength band light L2 is reflected by the first dichroic mirror 151, so that light in the reflection band W1b as partial wavelength component thereof is incident on the all-color transmission region 410A.

The blue wavelength band light L1 is transmitted through the all-color transmission region 410A or the blue-red transmission region 420A of the color wheel 201A to be guided to the light tunnel 175.

Embodiment

Figure 5:
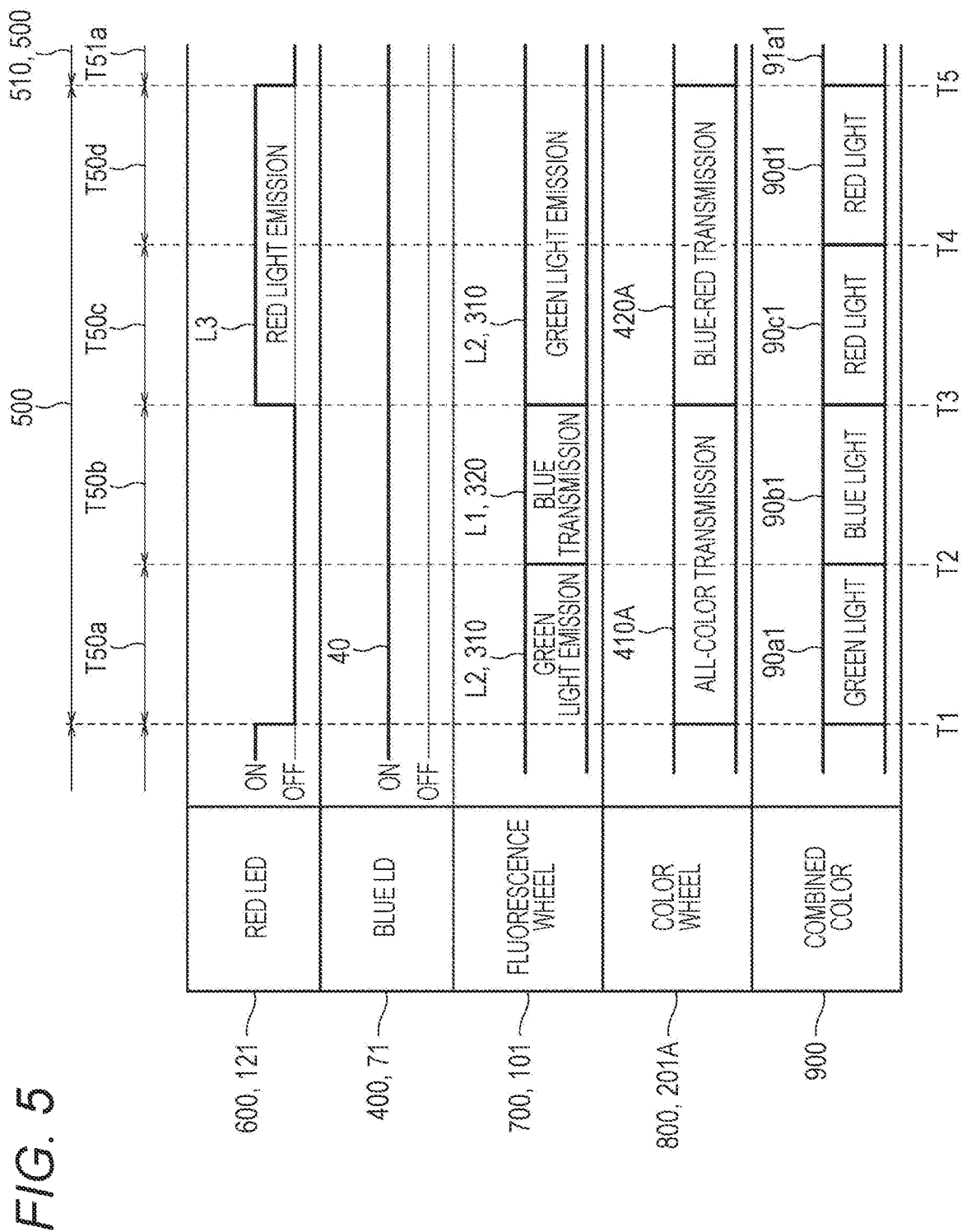
FIG. 5 is a timing chart of an operation of the light source device in a color prioritized mode (second output mode) according to the embodiment of the present invention.

FIG. 5 is a timing chart of an operation of the light source device 60 in a color prioritized mode (second output mode). As illustrated in FIG. 5, in a first output period T50a, the red wavelength band light L3 is turned off, and the all-color transmission region 410A provided in the color wheel 201A is irradiated with the green wavelength band light L2 emitted from the fluorescence wheel 101. In a second output period T50b, the red wavelength band light L3 is turned off, and the all-color transmission region 410A provided in the color wheel 201A is irradiated with the blue wavelength band light L1 emitted from the fluorescence wheel 101. In a third output period T50c and a fourth output period T50d, the blue-red transmission region 420A provided in the color wheel 201A is irradiated with the red wavelength band light L3 and the green wavelength band light L2.

As a result, combined light 900 can be emitted as green wavelength band light 90a1 in the first output period T50a, as blue wavelength band light 90b1 in the second output period T50b, and as red wavelength band light 90c1, 90d1 in the third output period T50c and the fourth output period T50d.

Figure 6:
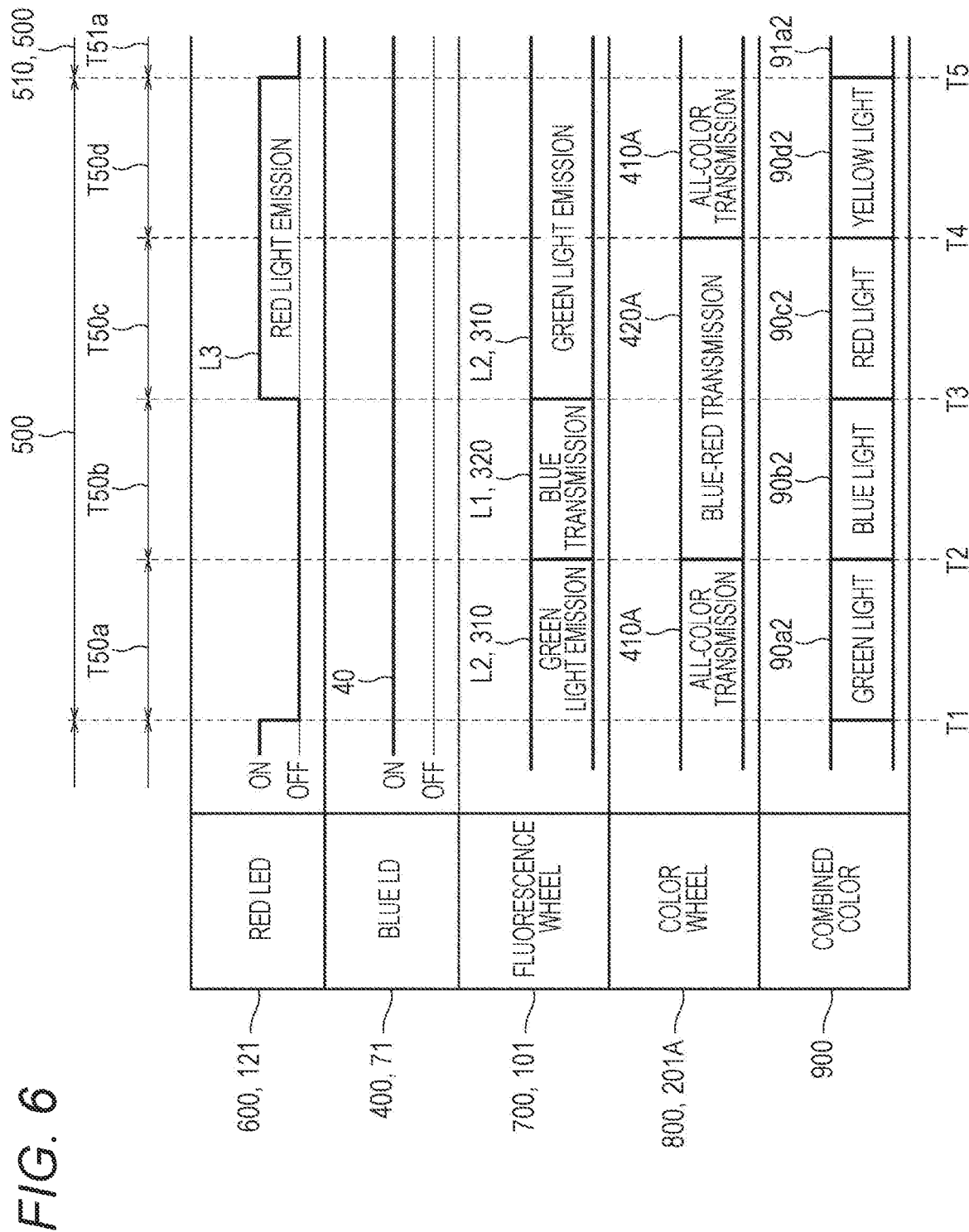
FIG. 6 is a timing chart of an operation of the light source device in a brightness prioritized mode (first output mode) according to the embodiment of the present invention.

Furthermore, the control unit 38 can shift the phase of the color wheel 201A with respect to the fluorescence wheel 101 through a light source control method illustrated in FIG. 9 and described later. FIG. 6 is a timing chart of an operation of the light source device 60 in brightness prioritized mode (first output mode). FIG. 6 is a schematic diagram illustrating an operation when changing the phase difference of the color wheel 201A with respect to the fluorescence wheel 101 of the light source device 60. The change in the phase difference of the color wheel 201A is controlled by the control unit 38. In the brightness prioritized mode, the color wheel 201A is moved from the state illustrated in FIG. 5, so that the blue-red transmission region 420A can be arranged for the second output period T50b and the third output period T50c and the all-color transmission region 410A can be arranged for the first output period T50a and the fourth output period T50d, as illustrated in FIG. 6.

In the first output period T50a, the red wavelength band light L3 is turned off, and the all-color transmission region 410A provided in the color wheel 201A is irradiated with the green wavelength band light L2 emitted from the fluorescence wheel 101. In a second output period T50b, the red wavelength band light L3 is turned off, and the blue-red transmission region 420A provided in the color wheel 201A is irradiated with the blue wavelength band light L1 emitted from the fluorescence wheel 101.

In the third output period T50c, the blue-red transmission region 420A is irradiated with the red wavelength band light L3 and the green wavelength band light L2 emitted from the fluorescence wheel 101. In the fourth output period T50d, the all-color transmission region 410A is irradiated with the red wavelength band light L3 and the green wavelength band light L2 emitted from the fluorescence wheel 101.

As a result, the combined light 900 can be emitted as green wavelength band light 90a2 in the first output period T50a, as blue wavelength band light 90b2 in the second output period T50b, as red wavelength band light 90c2 in the third output period T50c, and as red wavelength band light 90d2 in the fourth output period T50d.

As described above, the control unit 38 can perform time-division control on; the first output period T50a in which the second transmission region (all-color transmission region 410A) of the color wheel 201A is irradiated with the second wavelength band light; the second output period T50b in which the second transmission region (all-color transmission region 410A) or the third transmission region (blue-red transmission region 420A) of the color wheel 201A is irradiated with the first wavelength band light; the third output period T50c in which the third transmission region (blue-red transmission region 420A) of the color wheel 201A is irradiated with the second wavelength band light and the third wavelength band light; and the fourth output period T50d in which the second transmission region (all-color transmission region 410A) or the third transmission region (blue-red transmission region 420A) of the color wheel 201A is irradiated with the second wavelength band light and the third wavelength band light.

The second output period T50b is preferably equal to or longer than the fourth output period T50d. The second output period T50b is particularly preferably substantially the same as the fourth output period T50d. This is because if the second output period T50b and the fourth output period T50d are substantially the same, the blue-red transmission region 420A conforms to the switching of the combined light 900, regardless of whether the synchronization position of the color wheel 201A is shifted to the position illustrated in FIG. 5 or in FIG. 6.

Furthermore, the second output period T50b for emitting blue light being longer than the fourth output period T50d for emitting red light or yellow light, results in a blue light emission period including periods corresponding to both of the all-color transmission region 410A and the blue-red transmission region 420A of the color wheel 201A. Still, this raises no problem in terms of the color of the emitted light because regardless of which of the regions of the color wheel 201A the light will be transmitted through, it will be the timing of emitting the blue color.

(Modification)

Next, an operation of the light source device 60 in each of the brightness prioritized mode (first output mode) and the color prioritized mode (second output mode) will be described with reference to FIG. 7 and FIG. 8. The light source device 60 can switch the output mode by changing the phase difference of the color wheel 201B with respect to the fluorescence wheel 101. The color wheel 201B of this modification includes all-color transmission regions 410B, a red transmission region 420B, and a blue-green transmission region 430B arranged side by side in the circumferential direction, instead of the all-color transmission region 410A and the blue-red transmission region 420A of the color wheel 201A illustrated in FIG. 3B. The all-color transmission regions 410B are formed at two locations between the red transmission region 420B and the blue-green transmission region 430B. The all-color transmission region 410B can transmit visible light including the blue wavelength band light L1, the green wavelength band light L2, and the red wavelength band light L3. The red transmission region 420B has a cut-on wavelength substantially the same as the cut-on wavelength A11 of the blue-red transmission region 420A illustrated in FIG. 4, and can transmit the red wavelength band light L3. The blue-green transmission region 430B can transmit the blue wavelength band light L1 and most of a part of the green wavelength band light L2 on the short wavelength side.

Figure 7:
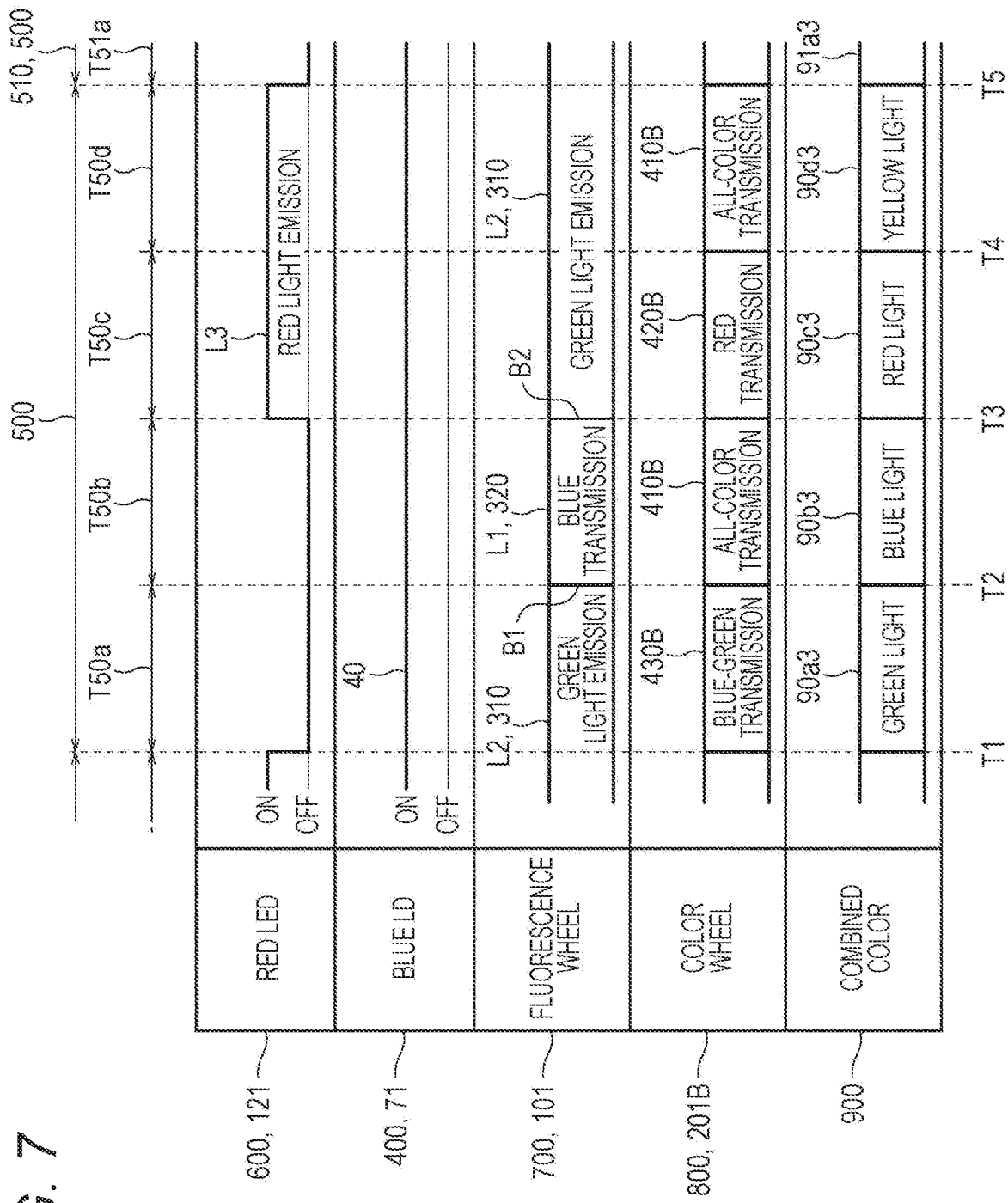
FIG. 7 is a timing chart of an operation of the light source device in a brightness prioritized mode (first output mode) according to a modification of the embodiment of the present invention.

FIG. 7 is a timing chart of an operation of the light source device 60 in the first output mode. The first output mode is a mode prioritizing the overall brightness with yellow light emitted, while improving color reproducibility of green. The light source device 60 forms one image for each frame 500 (510), and sequentially projects the images over a plurality of frames 500 in a time-division manner. The light source device 60 performs time division of the frame 500 into the first output period T50a, the second output period T50b, the third output period T50c, and the fourth output period T50d in this order, and emits light of a pre-allocated color in each of the output periods.

The red light emitting diode 121 (600) turns off the red wavelength band light L3 during the first output period T50a and the second output period T50b, and emits the red wavelength band light L3 during the third output period T50c and the fourth output period T50d. The blue laser diode 71 (400) emits the blue wavelength band light L1 (40) in the first output period T50a to the fourth output period T50d.

In the first output period T50a, the fluorescence emission region 310 of the fluorescence wheel 101 (700) is irradiated with the blue wavelength band light L1 output from the blue laser diode 71. Thus, the green wavelength band light L2 is emitted from the fluorescence emission region 310. The green wavelength band light L2 emitted from the fluorescence emission region 310 is guided by the light guiding optical system 150 (see FIG. 2) to be emitted onto the blue-green transmission region 430B of the color wheel 201B (800). The blue-green transmission region 430A transmits the component of the green wavelength band light L2 on the short wavelength side (light included in the transmission band W4a illustrated in FIG. 4). Thus, the light source device 60 emits the combined light 900 in the first output period T50a as the green wavelength band light 90a3, to the light tunnel 175. In the first output period T50a, the green wavelength band light 90a3 with high color purity, whose long wavelength side is shielded, is emitted.

In the second output period T50b, the transmission region 320 of the fluorescence wheel 101 is irradiated with the blue wavelength band light L1 emitted from the blue laser diode 71. Thus, the blue wavelength band light L1 is emitted onto and transmits through the transmission region 320. The blue wavelength band light L1 emitted from the transmission region 320 is guided by the light guiding optical system 150 to be emitted onto the all-color transmission region 410B of the color wheel 201B. The all-color transmission region 410B transmits most of the blue wavelength band light L1. Thus, in the second output period T50b, the light source device 60 guides the combined light 900 as the blue wavelength band light 90b3 to the light tunnel 175.

In the third output period T50c, the red wavelength band light L3 emitted from the red light emitting diode 121 is guided by the light guiding optical system 150 to be emitted onto and transmit through the red transmission region 420B of the color wheel 201B, and is directed to the light tunnel 175. In the third output period T50c, the fluorescence emission region 310 of the fluorescence wheel 101 is irradiated with the blue wavelength band light L1 emitted from the blue laser diode 71. Thus, the green wavelength band light L2 is emitted from the fluorescence emission region 310. The green wavelength band light L2 emitted from the fluorescence emission region 310 is guided by the light guiding optical system 150 to be emitted onto the red transmission region 420B of the color wheel 201B. The red transmission region 420B transmits light in the overlapping band W3 illustrated in FIG. 4. Thus, in the third output period T50c, the light source device 60 guides the combined light 900 as the red wavelength band light 90c3 (fourth wavelength band light) as a combination of the red wavelength band light L3 and the part of the green wavelength band light L2 corresponding to the overlapping band W3, to the light tunnel 175.

In the fourth output period T50d, the red wavelength band light L3 emitted from the red light emitting diode 121 is guided by the light guiding optical system 150 to be emitted onto and transmit through the all-color transmission region 410B of the color wheel 201B, and is directed to the light tunnel 175. In the fourth output period T50d, the fluorescence emission region 310 of the fluorescence wheel 101 is irradiated with the blue wavelength band light L1 emitted from the blue laser diode 71. Thus, the green wavelength band light L2 is emitted from the fluorescence emission region 310. The green wavelength band light L2 emitted from the fluorescence emission region 310 is guided by the light guiding optical system 150 to be emitted onto the all-color transmission region 410B of the color wheel 201B. A part of the green wavelength band light L2 on the long wavelength side of the cut-on wavelength A11 turns into discarded light due to the first dichroic mirror 151, but most of the part of the green wavelength band light L2 on the short wavelength side transmits through the all-color transmission region 410B. Thus, in the fourth output period T50d, the light source device 60 guides the combined light 900 as yellow wavelength band light 90d3 as a combination of the red wavelength band light L3 and the part of the green wavelength band light L2 corresponding to the reflection band W1b, to the light tunnel 175.

After the fourth output period T50d, a first output period T51a of the next frame 510 starts. In the first output period T51a, the light source device 60 controls the fluorescence wheel 101 and the color wheel 201B to emit the combined light 900 as the green wavelength band light 91a3, as in the first output period T50a described above. The operations to be repeated thereafter are the same as those in the frame 500.

As the fluorescence emission region 310 of the fluorescence wheel 101 illustrated in FIG. 3A, a yellow fluorescence emission region that is excited by excitation light to emit yellow wavelength band light may be formed. With this configuration, in the third output period T50c illustrated in FIG. 7, the components on a longer wavelength side than the cut-on wavelength A11 in the combined light 900 can be increased, so that bright red wavelength band light can be emitted. In this case, a green transmission region that transmits green wavelength band light may be arranged instead of the blue-green transmission region 430B of the color wheel 201B.

Figure 8:
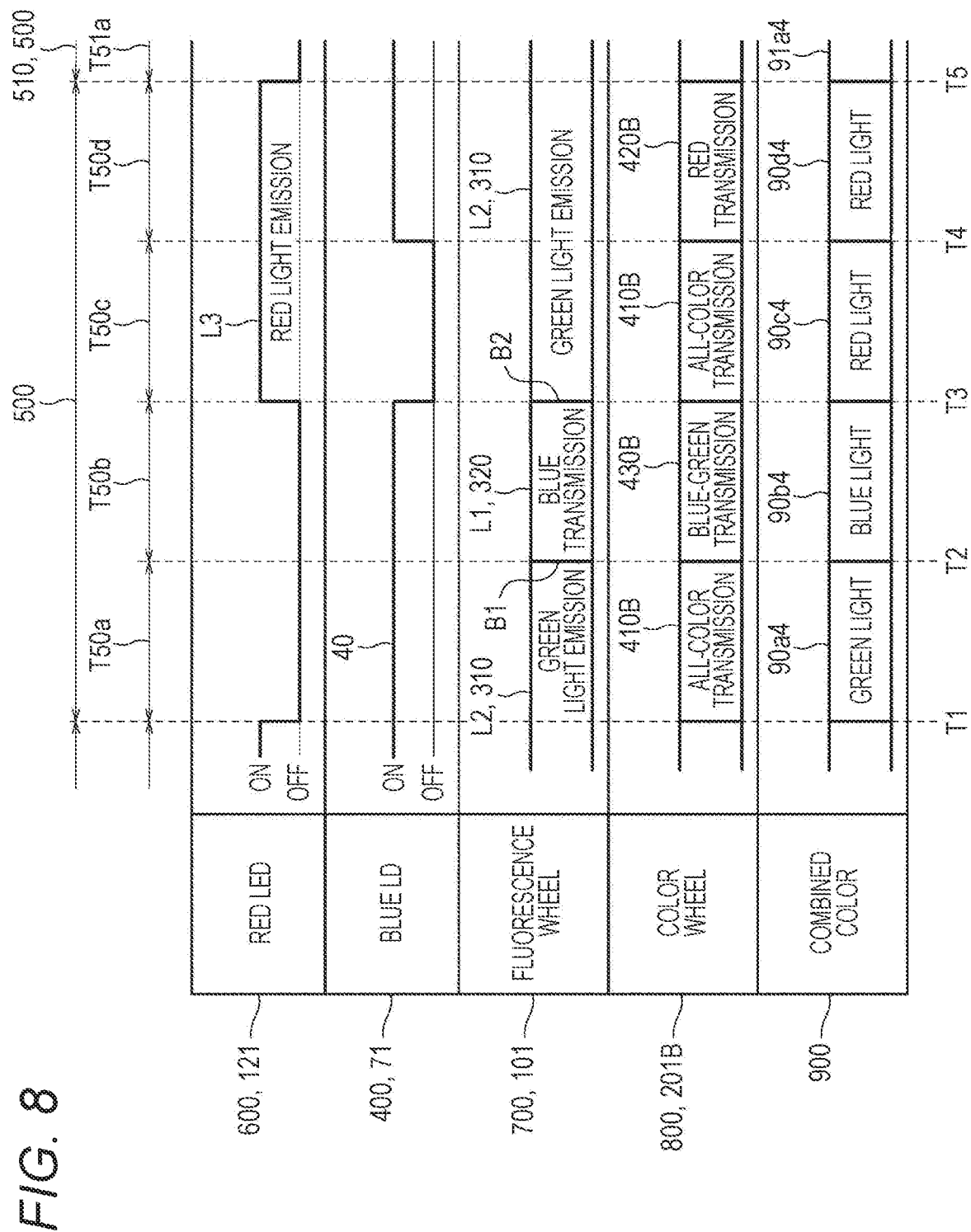
FIG. 8 is a timing chart of an operation of the light source device in a color prioritized mode (second output mode) according to the modification of the embodiment of the present invention.

FIG. 8 is a timing chart of an operation of the light source device 60 in a color prioritized mode (second output mode). The third output mode is a mode in which the emission period of the red wavelength band light is extended instead of the emission of the yellow wavelength band light, to prioritize the color reproducibility of the entire light source device 60. In the color prioritized mode, the red light emitting diode 121 operates in a manner that is the same as that in the brightness prioritized mode illustrated in FIG. 7, but a phase of a color wheel 201A is shifted with respect to the fluorescence wheel 101. Further, the emission timings of the blue laser diode 71 and the fluorescence wheel 101 in the first output period T50a, the second output period T50b, and the fourth output period T50d are the same as those in the brightness prioritized mode illustrated in FIG. 7. The output of the blue laser diode 71 in the third output period T50c is OFF.

In the first output period T50a, the green wavelength band light L2 emitted from the fluorescence emission region 310 is guided by the light guiding optical system 150 to be emitted onto the all-color transmission region 410B of the color wheel 201B. The components of the guided green wavelength band light L2 on a shorter wavelength side than the cut-on wavelength A11 illustrated in FIG. 4 are transmitted through the all-color transmission region 410B. As a result, in the first output period T50a, the light source device 60 guides to the light tunnel 175, the combined light 900 as green wavelength band light 90a4 of a wider band than that guided in the first output period T50a in FIG. 7.

In the second output period T50b, the transmission region 320 of the fluorescence wheel 101 is irradiated with the blue wavelength band light L1 emitted from the blue laser diode 71. Thus, the blue wavelength band light L1 is emitted onto and transmits through the transmission region 320. The blue wavelength band light L1 emitted from the transmission region 320 is guided by the light guiding optical system 150 to be emitted onto the blue-green transmission region 430B of the color wheel 201B. The blue-green transmission region 430B transmits most of the blue wavelength band light L1. Thus, in the second output period T50b, the light source device 60 guides the combined light 900 as blue wavelength band light 90b4 to the light tunnel 175.

In the third output period T50c, the red wavelength band light L3 emitted from the red light emitting diode 121 is guided by the light guiding optical system 150 to be emitted onto and transmit through the red transmission region 420B of the color wheel 201B, and is guided to the light tunnel 175. In the third output period T50c, the light intensity (light amount) of the blue wavelength band light L1 emitted from the blue laser diode 71 is turned OFF. As a result, in the third output period T50c, the light source device 60 guides the combined light 900 as red wavelength band light 90c4 to the light tunnel 175.

In the fourth output period T50d, an operation that is the same as that in the third output period T50c in the first output mode illustrated in FIG. 7 is performed. Thus, the light source device 60 guides the combined light 900 as the red wavelength band light 90d4 (fourth wavelength band light) as a combination of the red wavelength band light L3 and the part of the green wavelength band light L2 corresponding to the overlapping band W3, to the light tunnel 175.

After the fourth output period T50d, a first output period T51a of the next frame 510 starts. In the first output period T51a, the light source device 60 controls the fluorescence wheel 101 and the color wheel 201B to emit the combined light 900 as the green wavelength band light 91a3, as in the first output period T50a in the second output mode described above. The operations to be repeated thereafter are the same as those in the frame 500.

In FIG. 7, an example is illustrated in which any of the green wavelength band light, the blue wavelength band light, the red wavelength band light, and the yellow wavelength is constantly emitted in each of the first output period T50a, the second output period T50b, the third output period T50c, and the fourth output period T50d. Alternatively, the amount of the green wavelength band light, the blue wavelength band light, the red wavelength band light, and the yellow wavelength emitted in each of the output periods T50a, T50b, T50c, and T50d may be adjusted with each of the output periods T50a, T50b, T50c, and T50d appropriately provided with a period in which the red light emitting diode 121 and the blue laser diode 71 are turned off or dimmed.

Now, a light source control method is described in which the relative phases of the fluorescence wheel 101 and the color wheel 201B are changed when switching between the first output mode (brightness prioritized mode) illustrated in FIG. 6 or FIG. 7 and the second output mode (color prioritized mode) illustrated in FIG. 5 or FIG. 8.

FIG. 9 is a schematic diagram illustrating an operation when changing the phase difference of the color wheel 201A, 201B with respect to the fluorescence wheel 101 of the light source device 60. The change in the phase difference of the color wheel 201A, 201B is controlled by the control unit 38.

In FIG. 9, a phase difference 0 degrees is defined as a state where a phase of the boundary B1 (see FIG. 3A) of the fluorescence wheel 101 match a phase of the boundary of the color wheel 201B involving the transition from the blue-green transmission region 430B to the all-color transmission region 410B at a timing T2 at which the first output period T50a changes to the second output period T50b as illustrated in FIG. 7. In FIG. 9, a phase difference 90 degrees is defined as a state where the phase of the boundary B1 (see FIG. 3A) of the fluorescence wheel 101 match the phase of the boundary of the color wheel 201B involving the transition from the all-color transmission region 410B to the blue-green transmission region 430B at the timing T2 as illustrated in FIG. 8.

In the figure, it is assumed that the transition from the first output mode to the second output mode occurs. Thus, the target movement angle of the color wheel 201B is 90 degrees. In addition, a plurality of divided movement angles as a result of dividing the target movement angle into steps is each set to 10 degrees. The control unit 38 changes the relative phase of the color wheel 201B with respect to the fluorescence wheel 101 stepwise i.e. one of the divided movement angles (10 degrees) at a time, until the target movement angle (90 degrees) is reached. This makes it possible to switch between a plurality of output modes (the first output mode and the second output mode) different from each other in the light source light emitted. Further, when moving the phase of the color wheel 201B, the control unit 38 gradually changes the phase until the target movement angle (90 degrees) is reached, while confirming the completion of the movement for each divided movement angle (10 degrees).

A movement period T81 corresponding to the divided movement angle of the color wheel 201B may be a period over a single frame 500 or over a plurality of frames 500. In addition, a standby period T82 before moving the color wheel 201B again after the movement of the color wheel 201B for the divided movement angle has been completed may a period over a single frame 500 or over a plurality of frames 500. The number of frames in each of the movement periods T81 and the standby periods T82 may be constant until the target movement angle is reached, or may be variable, that is, may be gradually increased or reduced. Thus, the speed and the acceleration of the movement from the start to the end of the phase change can be reduced. Furthermore, with the phase difference of the color wheel 201B confirmed for a plurality of times, that is, for each of the divided movement angles, improved followability can be achieved.

With the control as described above, the speed of the phase change of the color wheel 201A, 201B can be reduced, and overshoot and undershoot after reaching the target movement angle can be reduced. Thus, light of a color different from a color that is supposed to be projected on the screen (for example, mixture of highly visually noticeable green in poorly visually noticeable blue) can be prevented at the time of the phase change. Thus, the image projected on the screen can be prevented from flickering. Furthermore, due to the small change in the phase speed, it is possible to reduce the drive noise generated from the motor 210 and to suppress the increase in the drive current due to the phase change of the motor 210.

The light source device 60, the projection device 10, and the light source control method according to the present embodiment have been described above. The position of the cut-off wavelength A31 and the cut-on wavelengths A11 and A22 illustrated in FIG. 4 are wavelengths corresponding to 50% transmittance in each transmission characteristic A1a and A2a for a description. However, this is merely an example, and the transmission characteristics A1a and A2a may be appropriately set so that the cut-off wavelength A21 and the cut-on wavelengths A11 and A22 correspond to 95% transmittance and the like.

In the above embodiment, the blue laser diode 71 (first light emitting element) is used for blue wavelength band light (first wavelength band light), but the present invention is not limited to this configuration. For example, instead of the blue laser diode 71, an ultraviolet laser diode that emits laser light in an ultraviolet wavelength band may be used as an excitation light source that excites the fluorescence emission region of the fluorescence wheel 101. In this case, the fluorescence wheel does not require the first transmission region that transmits the blue wavelength band light (first wavelength band light). Instead, it is necessary to separately provide a semiconductor light emitting element such as a blue LED that emits blue wavelength band light (first wavelength band light). For example, the blue LED can be arranged at a position facing the color wheels 201A and 201B with the second dichroic mirror 152 serving as a positional reference. The second dichroic mirror 152 in this configuration may have the characteristic that is the same as that in the embodiment described above.

Furthermore, in the configuration described in the present embodiment, when switching between the first output mode and the second output mode, the color wheels 201A, 201B are moved one step at a time, that is, one of the divided movement angles at a time. However, the transmission regions 410A, 420A, and 410B to 430B provided in the color wheel 201A, 201B may have different configurations.

The light source device 60 and the projection device 10 described above in each embodiment include a first light emitting element that emits first wavelength band light, the fluorescence wheel 101 including a fluorescence emission region that emits fluorescence excited by the first wavelength band light as second wavelength band light, a second light emitting element that emits third wavelength band light that is on a longer wavelength side than the second wavelength band light, a combining unit that combines the first wavelength band light, the second wavelength band light, and the third wavelength band light, a color wheel, and the control unit 38. The color wheel includes a plurality of regions one of which is a region for selecting as fourth wavelength band light, the third wavelength band light and a part of the second wavelength band light on the long wavelength side. Another one of the plurality of regions is a region for selecting as fifth wavelength band light, a part of the second wavelength band on the short wavelength side light guided by the combining unit. The control unit 38 performs time division control on the first wavelength band light, the fourth wavelength band light, and the fifth wavelength band light. Thus, the amount of light can be increased when the third wavelength band light is emitted. Furthermore, the color purity can be improved with partial components on the long wavelength side removed when the second wavelength band light is emitted. Thus, the light source control method for the light source device 60 and the projection device 10 with improved overall color balance can be achieved.

Furthermore, the fluorescence wheel 101 has a first transmission region that transmits the first wavelength band light. The color wheel 201A is configured to include a plurality of regions including; a plurality of second transmission regions that transmit the first wavelength band light, the second wavelength band light, and the third wavelength band light; a third transmission region that is a region for selecting as the fourth wavelength band light, the third wavelength band light and a part of the second wavelength band light on the long wavelength side; and a fourth transmission region that is a region for selecting as the fifth wavelength band light, the first wavelength band light and a part of the second wavelength band light on the short wavelength side. Thus, the wavelength components on the third wavelength band light side and the wavelength components on the second wavelength band light side can be adjusted with a simple configuration.

The combining unit includes the first dichroic mirror 151 that reflects a part of the second wavelength band light excluding light on a first long wavelength side and transmits the third wavelength band light, or transmits the part of the second wavelength band light excluding the light on the first long wavelength side and reflects the third wavelength band light to guide the part of the second wavelength band light excluding the light on the first long wavelength side and the third wavelength band light toward the color wheel 201A. Thus, the second wavelength band light and the third wavelength band light can be easily combined into the same optical path.

The third transmission region of the color wheel is configured to transmit the third wavelength band light and a part of the second wavelength band light on a second long wavelength side on a shorter wavelength side than the first wavelength side, among the third wavelength band light and the part of the second wavelength band light excluding the light on the first long wavelength side combined by the first dichroic mirror 151. Thus, bright light on the third wavelength band light side can be emitted as the light source light.

In the first output mode, the control unit 38 performs time-division control on; the first output period T50a in which the fourth transmission region of the color wheel 201A is irradiated with the second wavelength band light; the second output period T50b in which the second transmission region of the color wheel is irradiated with the first wavelength band light; the third output period T50c in which the third transmission region of the color wheel is irradiated with the second wavelength band light and the third wavelength band light; and the fourth output period T50d in which the second transmission region of the color wheel is irradiated with the second wavelength band light and the third wavelength band light. Thus, the color purity can be improved with partial components on the long wavelength side removed when the second wavelength band light is emitted while increasing the amount of light of similar colors when the third wavelength band light is emitted.

In the second output mode, the control unit 38 performs time-division control on; the first output period T50a in which the second transmission region of the color wheel is irradiated with the second wavelength band light; the second output period T50b in which the fourth transmission region of the color wheel is irradiated with the first wavelength band light; the third output period T50c in which the second transmission region of the color wheel is irradiated with the second wavelength band light and the third wavelength band light; and the fourth output period T50d in which the third transmission region of the color wheel is irradiated with the second wavelength band light and the third wavelength band light. Thus, the amount of light on the third wavelength band light side and the amount of light on the second wavelength band light side can be increased, whereby the overall brightness can be improved.

The third output mode is configured so that the first wavelength band light that excites the second wavelength band light in the third output period T50c is output with a lower light intensity than the first wavelength band light output in the first output period T50a, the second output period T50b, and the fourth output period T50d. Thus, in the third output period T50c and the fourth output period T50d, the light on the third wavelength band light side is emitted with an increased amount of light on the third wavelength band light side, whereby light source light with the color purity increased as a whole can be emitted.

With the light source control method for the light source device 60 in which the control unit 38 changes the relative phase of the color wheel 201A, 201B with respect to the fluorescence wheel 101 one step at a time, that is, one of a plurality of divided movement angles at a time until the target movement angle is reached, to switch between a plurality of output modes different from each other in the light source light emitted, the flickering of the image projected on the screen can be suppressed. Furthermore, due to the small change in the phase speed, it is possible to reduce the drive noise generated from the motor 210 and to suppress the increase in the drive current due to the phase change of the motor 210.

Furthermore, in the light source device 60, the control unit 38 changes the phase of the color wheel 201A while confirming the completion of the shifting for each of the divided movement angles, until the target movement angle is reached. Thus, higher followability to the control signal can be achieved. Furthermore, overshoot and undershoot can be suppressed after the target movement angle has been achieved.

The first light emitting element is the blue laser diode 71, the second light emitting element is the red light emitting diode 121, the first wavelength band light is blue wavelength band light, the second wavelength band light is green wavelength band light, and the third wavelength band light is red wavelength band light. Thus, the light source device 60 capable of projecting a color image with improved color balance can be configured.

Note that the above-described embodiments have been presented as examples, and are not intended to limit the scope of the invention. These new embodiments can be implemented in other various forms, and various omissions, replacements, and changes can be made without departing from the spirit of the invention. These embodiments and their modifications are included in the scope and gist of the invention, and are also included in the scope of the invention described in the claims and their equivalents.

What is claimed is:

1. A light source device comprising:
   a first light emitting element that emits first wavelength band light;
   a fluorescence wheel including a fluorescence emission region with which fluorescence excited by the first wavelength band light is emitted as second wavelength band light;
   a second light emitting element that emits third wavelength band light that is on a longer wavelength side than the second wavelength band light;
   a combining unit that combines the first wavelength band light, the second wavelength band light, and the third wavelength band light;
   a color wheel including a region with which the third wavelength band light and a part of the second wavelength band light on the long wavelength side are selected as fourth wavelength band light and a region that transmits visible light, the third wavelength band light and the part of the second wavelength band light being combined by the combining unit; and
   a CPU that controls the first light emitting element, the second light emitting element, the fluorescence wheel, and the color wheel to implement time-division emission of the first wavelength band light and the fourth wavelength band light, wherein
   the CPU performs synchronization control on the fluorescence wheel and the color wheel, and performs control to shift a synchronization position of the color wheel with respect to the fluorescence wheel in accordance with an output mode.

2. The light source device according to claim 1, wherein
   the region that transmits the visible light is a second transmission region, and
   the region that selectively transmits the fourth wavelength band light is a third transmission region that also transmits the first wavelength band light.

3. The light source device according to claim 2, wherein the CPU performs time-division control on
   a first output period in which the second transmission region of the color wheel is irradiated with the second wavelength band light,
   a second output period in which the second transmission region or the third transmission region of the color wheel is irradiated with the first wavelength band light,
   a third output period in which the third transmission region of the color wheel is irradiated with the second wavelength band light and the third wavelength band light, and
   a fourth output period in which the second transmission region or the third transmission region of the color wheel is irradiated with the second wavelength band light and the third wavelength band light.

4. The light source device according to claim 3, wherein the second output period is equal to or longer than the fourth output period.

5. The light source device according to claim 3, wherein the second output period is substantially as long as the fourth output period.

6. The light source device according to claim 2, wherein the combining unit includes a first dichroic mirror that reflects a part of the second wavelength band light excluding light on a first long wavelength side and transmits the third wavelength band light, or transmits the part of the second wavelength band light excluding the light on the first long wavelength side and reflects the third wavelength band light to guide the part of the second wavelength band light excluding the light on the first long wavelength side and the third wavelength band light toward the color wheel.

7. The light source device according to claim 3, wherein the combining unit includes a first dichroic mirror that reflects a part of the second wavelength band light excluding light on a first long wavelength side and transmits the third wavelength band light, or transmits the part of the second wavelength band light excluding the light on the first long wavelength side and reflects the third wavelength band light to guide the part of the second wavelength band light excluding the light on the first long wavelength side and the third wavelength band light toward the color wheel.

8. The light source device according to claim 4, wherein the combining unit includes a first dichroic mirror that reflects a part of the second wavelength band light excluding light on a first long wavelength side and transmits the third wavelength band light, or transmits the part of the second wavelength band light excluding the light on the first long wavelength side and reflects the third wavelength band light to guide the part of the second wavelength band light excluding the light on the first long wavelength side and the third wavelength band light toward the color wheel.

9. The light source device according to claim 5, wherein the combining unit includes a first dichroic mirror that reflects a part of the second wavelength band light excluding light on a first long wavelength side and transmits the third wavelength band light, or transmits the part of the second wavelength band light excluding the light on the first long wavelength side and reflects the third wavelength band light to guide the part of the second wavelength band light excluding the light on the first long wavelength side and the third wavelength band light toward the color wheel.

10. The light source device according to claim 6, wherein the third transmission region of the color wheel transmits the third wavelength band light and a part of the second wavelength band light on a second long wavelength side on a shorter wavelength side than the first long wavelength side, among the third wavelength band light and the part of the second wavelength band light excluding the light on the first long wavelength side combined by the first dichroic mirror.

11. The light source device according to claim 7, wherein the third transmission region of the color wheel transmits the third wavelength band light and a part of the second wavelength band light on a second long wavelength side on a shorter wavelength side than the first long wavelength side, among the third wavelength band light and the part of the second wavelength band light excluding the light on the first long wavelength side combined by the first dichroic mirror.

12. The light source device according to claim 8, wherein the third transmission region of the color wheel transmits the third wavelength band light and a part of the second wavelength band light on a second long wavelength side on a shorter wavelength side than the first long wavelength side, among the third wavelength band light and the part of the second wavelength band light excluding the light on the first long wavelength side combined by the first dichroic mirror.

13. The light source device according to claim 9, wherein the third transmission region of the color wheel transmits the third wavelength band light and a part of the second wavelength band light on a second long wavelength side on a shorter wavelength side than the first long wavelength side, among the third wavelength band light and the part of the second wavelength band light excluding the light on the first long wavelength side combined by the first dichroic mirror.

14. The light source device according to claim 1, wherein the CPU switches between a plurality of the output modes different from each other in light source light emitted, by shifting a relative phase of the color wheel with respect to the fluorescence wheel one step at a time, that is, one of a plurality of divided movement angles at a time until a target movement angle is reached.

15. The light source device according to claim 14, wherein the CPU shifts the phase of the color wheel to the target movement angle while confirming completion of shifting for each of the plurality of divided movement angles.

16. The light source device according to claim 1, wherein the first light emitting element is a blue laser diode, the second light emitting element is a red light emitting diode, the first wavelength band light is blue wavelength band light, the second wavelength band light is green wavelength band light, and the third wavelength band light is red wavelength band light.

17. The light source device according to claim 1, wherein yellow wavelength band light is obtained as a result of combining the second wavelength band light and the third wavelength band light.

18. A projection device comprising:
the light source device according to claim 1;
a display element that generates image light; and
a projection optical system that projects the image light, emitted from the display element, onto a screen, wherein
the CPU controls the light source device and the display element.

19. A light source control method for a light source device including
a first light emitting element that emits first wavelength band light,
a fluorescence wheel including a fluorescence emission region with which fluorescence excited by the first wavelength band light is emitted as second wavelength band light,
a second light emitting element that emits third wavelength band light that is on a longer wavelength side than the second wavelength band light,
a combining unit that combines the first wavelength band light, the second wavelength band light, and the third wavelength band light,
a color wheel including a region with which the third wavelength band light and a part of the second wavelength band light on the long wavelength side are selected as fourth wavelength band light and a region that transmits visible light, the third wavelength band light and the part of the second wavelength band light being combined by the combining unit, and
a CPU, the method comprising the step of:
by the CPU, controlling the first light emitting element, the second light emitting element, the fluorescence wheel, and the color wheel to implement time-division emission of the first wavelength band light and the fourth wavelength band light, performing synchronization control on the fluorescence wheel and the color wheel, and performing control to shift a synchronization position of the color wheel with respect to the fluorescence wheel in accordance with an output mode.

20. The light source control method according to claim 19, further comprising the step of:
by the CPU, switching between a plurality of the output modes different from each other in light source light emitted, by shifting a relative phase of the color wheel with respect to the fluorescence wheel one step at a time, that is, one of a plurality of divided movement angles at a time until a target movement angle is reached.

* * * * *